(12) United States Patent
Fan et al.

(10) Patent No.: US 12,213,174 B2
(45) Date of Patent: Jan. 28, 2025

(54) INDICATION SIGNAL TRANSMISSION METHOD AND APPARATUS

(71) Applicant: HUAWEI TECHNOLOGIES CO., LTD., Guangdong (CN)

(72) Inventors: Weiwei Fan, Shanghai (CN); Hongjia Su, Shanghai (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/666,053

(22) Filed: Feb. 7, 2022

(65) Prior Publication Data
US 2022/0159724 A1 May 19, 2022

Related U.S. Application Data

(63) Continuation of application No. PCT/CN2020/109314, filed on Aug. 14, 2020.

(30) Foreign Application Priority Data

Aug. 15, 2019 (CN) .......................... 201910754867.9

(51) Int. Cl.
*H04W 72/04* (2023.01)
*H04W 52/36* (2009.01)
(Continued)

(52) U.S. Cl.
CPC ... *H04W 74/0816* (2013.01); *H04W 72/0446* (2013.01); *H04W 74/0866* (2013.01)

(58) Field of Classification Search
None
See application file for complete search history.

(56) References Cited

U.S. PATENT DOCUMENTS

| 2014/0376458 A1* | 12/2014 | Ryu | H04W 72/542 370/329 |
| 2015/0009970 A1* | 1/2015 | Yu | H04W 72/541 370/336 |

(Continued)

FOREIGN PATENT DOCUMENTS

| CN | 106162900 A | 11/2016 |
| CN | 108024310 A | 5/2018 |

(Continued)

OTHER PUBLICATIONS

Wang, "Friendly Coexistence and Resource Management of V2V Communications and Wi-Fi in Unlicensed Bands," Jun. 2018, 2 pages (English abstract).
ITRI, "Discussion on NR Sidelink Resource Allocation for Mode 2," 3GPP TSG RAN WG1 #96bis, R1-1905077, Xi'an, China, Apr. 8-12, 2019, 8 pages.
Liu et al., "Device-to-Device Communications in Unlicensed Spectrum: Mode Selection and Resource Allocation," IEEE Access, Aug. 2016, 10 pages.

(Continued)

*Primary Examiner* — Sai Aung
(74) *Attorney, Agent, or Firm* — Fish & Richardson P.C.

(57) ABSTRACT

This application provides example signal transmission method and apparatus. One example method includes sending, by a first terminal device to a second terminal device, indication information indicating a signal transmission resource. Listen before talk (LBT) is performed by the first terminal device before transmission with the second terminal device is performed. Transmission with the second terminal device is performed by the first terminal device according to the indication information.

17 Claims, 11 Drawing Sheets

(51) Int. Cl.
 *H04W 72/0446* (2023.01)
 *H04W 74/08* (2024.01)
 *H04W 74/0816* (2024.01)

(56) References Cited

U.S. PATENT DOCUMENTS

| | | | | |
|---|---|---|---|---|
| 2017/0086194 | A1* | 3/2017 | Tavildar | H04W 74/0808 |
| 2017/0150340 | A1* | 5/2017 | Park | H04W 74/0833 |
| 2017/0339530 | A1* | 11/2017 | Maaref | H04L 5/0055 |
| 2018/0199388 | A1* | 7/2018 | Tabet | H04W 76/14 |
| 2018/0220418 | A1 | 8/2018 | Baghel et al. | |
| 2019/0306923 | A1* | 10/2019 | Xiong | H04J 13/0062 |
| 2020/0059962 | A1* | 2/2020 | Tejedor | H04W 76/14 |
| 2024/0095100 | A1* | 3/2024 | Pateromichelakis | G06F 9/541 |

FOREIGN PATENT DOCUMENTS

| | | |
|---|---|---|
| CN | 109156035 A | 1/2019 |
| CN | 109309961 A | 2/2019 |
| CN | 110100462 A | 8/2019 |
| WO | 2016091183 A1 | 6/2016 |
| WO | 2017213393 A1 | 12/2017 |
| WO | 2018048642 A1 | 3/2018 |

OTHER PUBLICATIONS

Apple, "Considerations on NR V2X mode 2 resource allocation mechanism," 3GPP TSG RAN WG1 #97, R1-1907335, Reno, USA, May 13-17, 2019, 6 pages.
MediaTek Inc., "On sidelink mode-2 resource allocation," 3GPP TSG RAN WG1 Meeting #97, R1-1906555, Reno, USA, May 13-17, 2019, 8 pages.
Office Action issued in Chinese Application No. 201910754867.9 on Jul. 13, 2021, 11 pages (with English translation).
Ericsson, "On UE Procedures Related to Group-Common PDCCH," 3GPP TSG RAN WG1 NR Ad-Hoc #2, R1-1711485, Qingdao, China, Jun. 27-30, 2017, 4 pages.
Extended European Search Report issued in European Application No. 20851997.5 on Jul. 29, 2022, 8 pages.
Huawei et al., "Design and contents of PSCCH and PSFCH," 3GPP TSG RAN WG1 Meeting #96, R1-1903071, Athens, Greece, Feb. 25-Mar. 1, 2019, 10 pages.
Interdigital Inc, "Mode 2a and Mode 2d for NR V2X Resource Allocation," 3GPP RAN WG1 Meeting AH 1901, R1-1900769, Taipei, Taiwan, Jan. 21-25, 2019, 16 pages.

* cited by examiner

INDICATION SIGNAL TRANSMISSION METHOD AND APPARATUS

CROSS-REFERENCE TO RELATED APPLICATIONS

This application is a continuation of International Application No. PCT/CN2020/109314, filed on Aug. 14, 2020, which claims priority to Chinese Patent Application No. 201910754867.9, filed on Aug. 15, 2019. The disclosures of the aforementioned applications are hereby incorporated by reference in their entireties.

TECHNICAL FIELD

This application relates to the field of communications technologies, and in particular, to an indication signal transmission method and apparatus.

BACKGROUND

Long term evolution (LTE) has started to support device-to-device (D2D) communication, or referred to as sidelink communication, in a cellular network since 3GPP Release 12. To avoid a conflict between D2D communication and existing universal user (UU) communication, a standard stipulates a resource pool for D2D communication.

In LTE, two device-to-device resource configuration modes (that is, mode 1 and mode 2) are available. In the resource configuration mode of mode 1, a base station configures a plurality of resource pools for a D2D device in advance by using radio resource control (RRC) signaling. When the D2D device requests to perform D2D transmission, the base station activates, by using downlink control information (DCI) signaling, a corresponding resource pool for D2D transmission. A difference of the resource configuration mode of mode 2 from the resource configuration mode of mode 1 lies in that when a D2D device needs to perform D2D transmission, the D2D device selects, from a predefined resource pool, some time-frequency resources for performing D2D transmission.

In NR-V2X, a D2D resource transmission mode also uses a resource pool-based resource configuration mode similar to that in LTE-D2D. In a resource pool, a physical sidelink feedback channel (PSFCH) resource for sending feedback information is periodically configured for a D2D device by using upper-layer signaling (for example, RRC).

However, a current resource configuration mode cannot be well applied to an unlicensed frequency band due to uncertainty of accessing a channel by using the unlicensed frequency band.

SUMMARY

This application provides an indication signal transmission method and apparatus, to resolve the problem that an existing D2D transmission resource configuration mode cannot be well applied to an unlicensed frequency band.

According to a first aspect, an indication signal transmission method according to an embodiment of this application includes: A first terminal device sends, to a second terminal device, indication information used to indicate a signal transmission resource. The first terminal device performs listen before talk (LBT) before performing transmission with the second terminal device. Then, the first terminal device performs transmission with the second terminal device according to the indication information. In this embodiment of this application, the first terminal device sends the indication information to the second terminal device. Even if LBT exists, the first terminal device can still accurately perform transmission with the second terminal device at a configured resource location, and a flexible frame structure can be supported in an unlicensed frequency band.

In a possible design, the indication information may include but is not limited to at least one of the following information: channel occupancy duration, frame structure information, and feedback channel resource indication information, where the feedback channel resource indication information is used to indicate a feedback channel resource. In the foregoing manner, the channel occupancy duration is indicated in the indication information. This is favorable for channel occupancy protection and channel occupancy duration sharing in transmission between the first terminal device and the second terminal device. In addition, a frame structure is indicated in the indication information, so that a flexible frame structure can be supported in an unlicensed frequency band. Moreover, compared with a fixed feedback channel indication manner in NR-V2X, flexibly indicating a channel resource location of a feedback channel in the indication information can reduce a waste of transmission resources.

In a possible design, the frame structure information may include a transmission direction of each slot unit in the transmission resource between the first terminal device and the second terminal device, and location information of an idle slot. In the foregoing manner, the second terminal device may deduce a structure of a frame signal based on the transmission direction of each slot unit and the location information of the idle slot; and then may receive, based on the structure of the frame signal, a frame signal sent by the first terminal device, thereby improving transmission accuracy.

In a possible design, the transmission direction of each slot unit in the transmission resource may be indicated by using a bitmap.

In a possible design, the location information of the idle slot includes a slot offset of the idle slot relative to the indication information, an intra-slot symbol offset, and a symbol length. In the foregoing manner, the second terminal device can accurately determine a location of the idle slot based on the slot offset of the idle slot relative to the indication information, the intra-slot symbol offset, and the symbol length.

In a possible design, the feedback channel resource indication information includes a slot offset of the feedback channel resource relative to the indication information, an intra-slot symbol offset, a symbol length, and an occupied bandwidth. In the foregoing manner, the second terminal device can determine a location of the feedback channel resource based on the slot offset of the feedback channel resource relative to the indication information, the intra-slot symbol offset, the symbol length, and the occupied bandwidth, thereby sending a feedback channel on the feedback channel resource.

In a possible design, the frame structure information may be further used to indicate a third terminal device to multiplex the transmission resource between the first terminal device and the second terminal device. In the foregoing manner, when a received signal strength indicator (RSSI) measured by the third terminal device is relatively small, the third terminal device may multiplex the transmission resource between the first terminal device and the second terminal device as indicated by the indication information, thereby improving spectral efficiency without affecting transmission between the first terminal device and the second terminal device.

In a possible design, the indication information may further carry the following information: an L1 address of the first terminal device (that is, an L1 source address of the transmission), an L1 address of the second terminal device (that is, an L1 receiving address or an L1 destination address of the transmission), a hybrid automatic repeat request (HARQ) process ID, a new data indicator (NDI), a redundancy version (RV), and other information.

In a possible design, before sending the indication information to the second terminal device, the first terminal device may further receive a first message sent by a network device, where the first message is used to configure the transmission resource between the first terminal device and the second terminal device. In the foregoing method, a configured grant-based resource configuration mode is used. This can avoid a problem of a waste of transmission resources in a resource pool-based resource configuration mode that is used in NR-V2X and in which transmission is performed always in an uplink slot.

In a possible design, the first message may be DCI. By using the foregoing design, the network device may dynamically configure a resource for the first terminal device for performing sidelink communication with the second terminal device.

In a possible design, the transmission resource is a segment of time-frequency resources that are continuous in time domain. The network device may dynamically configure a segment of continuous time-frequency resources for the first terminal device for performing sidelink communication with the second terminal device.

In a possible design, a resource for transmitting a frame signal may be a part of a configured grant resource configured by the network device. In this way, the first terminal device may communicate with the second terminal device on the configured grant resource according to the indication information.

In a possible design, the first message may carry a transmission direction of the transmission resource. In the foregoing design, transmission resources that are orthogonal resources are allocated to different terminal devices. This can alleviate a problem of interference at a receive end caused by a hidden node, thereby improving a success rate of transmission between the first terminal device and the second terminal device, reducing a bit error rate at the receive end, and improving spectral efficiency.

In a possible design, the first message may be further used to indicate, to the first terminal device, a time-frequency resource for sending and receiving the indication information. By using the foregoing design, the first terminal device may send and receive indication information on the time-frequency resource indicated by the first message.

In a possible design, the first message may specifically carry an intra-slot symbol offset, a starting physical resource block (PRB), and a quantity of PRBs of the time-frequency resource for sending and receiving indication information. In the foregoing manner, the first terminal can accurately determine a location of the time-frequency resource for sending and receiving indication information.

In a possible design, the indication information may be a sidelink control signaling indication (sidelink control indication, SCI).

According to a second aspect, this application provides an indication signal transmission apparatus. The apparatus includes: a communications module, configured to send, to another terminal device, indication information used to indicate a signal transmission resource; and a processor, configured to perform listen before talk (LBT) by using the communications module before the communications module performs transmission with the another terminal device. The communications module is further configured to perform transmission with the first terminal device according to the indication information.

In a possible design, the indication information may carry at least one of the following information: channel occupancy duration, frame structure information, and feedback channel resource indication information, where the feedback channel resource indication information is used to indicate a feedback channel resource.

In a possible design, the frame structure information may include a transmission direction of each slot unit in the transmission resource between the apparatus and the first terminal device, and location information of an idle slot.

In a possible design, the location information of the idle slot may include a slot offset of the idle slot relative to the indication information, an intra-slot symbol offset, and a symbol length.

In a possible design, the feedback channel resource indication information may include a slot offset of the feedback channel resource relative to the indication information, an intra-slot symbol offset, a symbol length, and an occupied bandwidth.

In a possible design, the frame structure information may be further used to indicate a second terminal device to multiplex the transmission resource between the apparatus and the first terminal device.

In a possible design, before sending the indication information to the first terminal device, the communications module may be further configured to receive a first message sent by a network device, where the first message is used to configure the transmission resource between the apparatus and the first terminal device.

In a possible design, the first message may carry a transmission direction of the transmission resource.

In a possible design, the first message may be further used to indicate, to the apparatus, a time-frequency resource for sending and receiving indication information.

In a possible design, the first message may be DCI.

In a possible design, the transmission resource may be a segment of time-frequency resources that are continuous in time domain.

In a possible design, that the first message is further used to indicate, to the apparatus, a time-frequency resource for sending and receiving indication information includes: The first message carries an intra-slot symbol offset, a starting physical resource block PRB, and a quantity of PRBs of the time-frequency resource for sending and receiving indication information.

In a possible design, the indication information may be SCI.

According to a third aspect, this application provides an indication signal transmission apparatus. The apparatus may be a terminal device, or may be a chip or a chipset in a terminal device. The apparatus may include a processing module and a transceiver module. When the apparatus is a terminal device, the processing module may be a processor, and the transceiver module may be a transceiver. The apparatus may further include a storage module. The storage module may be a memory. The storage module is configured to store instructions. The processing module executes the instructions stored in the storage module, to enable the terminal device to perform corresponding functions according to the first aspect. When the apparatus is a chip or a chipset in a terminal device, the processing module may be a processor, and the transceiver module may be an input/output interface, a pin, a circuit, or the like. The processing module executes the instructions stored in the storage module, to enable the terminal device to perform corresponding functions according to the first aspect. The storage module may be a storage module (for example, a register or a cache) in the chip or chipset, or may be a storage module (for example, a read-only memory or a random access memory) located outside the chip or chipset in the terminal device.

According to a fourth aspect, an indication signal transmission apparatus is provided, including a processor, a communications interface, and a memory. The communications interface is configured to transmit information, a message, and/or data between the apparatus and another apparatus. The memory is configured to store computer executable instructions. When the apparatus runs, the processor executes the computer executable instructions stored in the memory, to enable the apparatus to perform the indication signal transmission method according to any one of the first aspect or the designs of the first aspect.

According to a fifth aspect, this application further provides a computer-readable storage medium. The computer-readable storage medium stores instructions. When the instructions are run on a computer, the computer is enabled to perform the method according to the foregoing aspects.

According to a sixth aspect, this application further provides a computer program product including instructions. When the computer program product runs on a computer, the computer is enabled to perform the indication signal transmission method according to any one of the first aspect or the designs of the first aspect.

DESCRIPTION OF EMBODIMENTS

Figure 1:
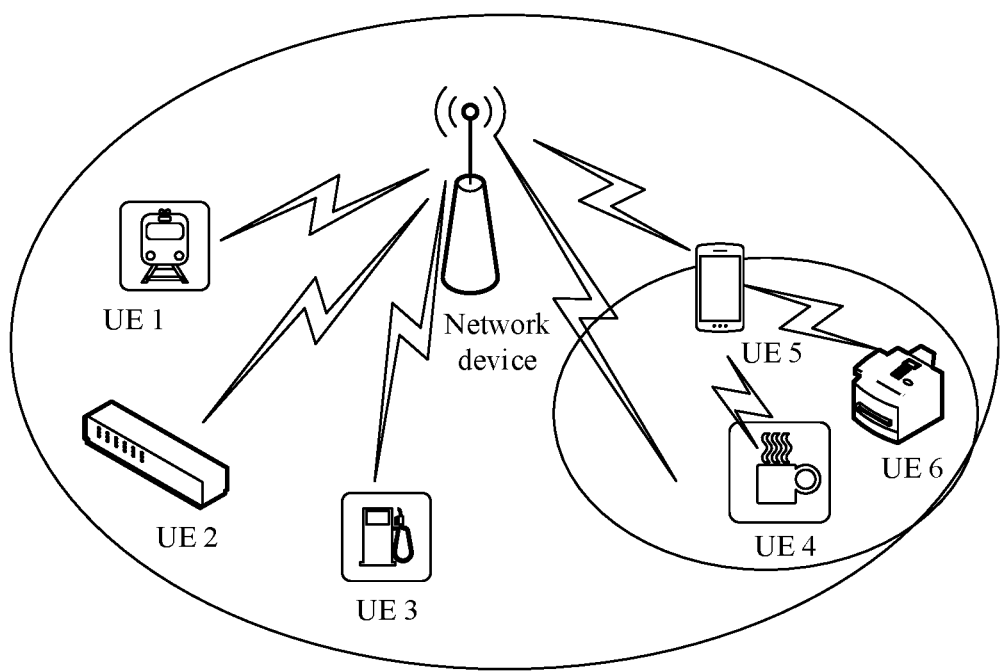
FIG. 1 is a schematic diagram of an architecture of a communications system according to this application.

An indication signal transmission method provided in this application may be applied to a 5G new radio (NR) unlicensed system, or may also be applied to another communications system, which may be, for example, an internet of things (IoT) system, a vehicle-to-everything (V2X) system, a narrowband internet of things (NB-IoT) system, or a long term evolution (LTE) system; may be a fifth-generation (5G) communications system; may be an LTE and 5G hybrid architecture; may be a 5G new radio (NR) system; may be a new communications system that will emerge in future communication development; or the like. The indication signal transmission method provided in embodiments of this application can be used provided that an entity in a communications system needs to send a frame signal (burst) resource indication information and a related parameter for device-to-device (D2D) communication, and another entity needs to receive the indication information and determine, according to the indication information, a resource location and a sending process for D2D transmission.

A terminal in the embodiments of this application is a user-side entity configured to receive or transmit a signal. The terminal may be a device that provides a user with voice and/or data connectivity, for example, a handheld device or a vehicle-mounted device having a wireless connection function. The terminal may alternatively be another processing device connected to a wireless modem. The terminal may communicate with one or more core networks via a radio access network (RAN). The terminal may also be referred to as a wireless terminal, a subscriber unit, a subscriber station, a mobile station, a mobile, a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or in-vehicle mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). Common terminal devices include, for example, mobile phones, tablet computers, notebook computers, palmtop computers, mobile internet devices (MID), wearable devices (such as smartwatches, smart bands, and pedometers), intelligent home appliances (such as intelligent refrigerators and intelligent washing machines), and the like. However, the embodiments of this application are not limited thereto.

A network device in the embodiments of this application is a network-side entity configured to transmit or receive a signal, may be configured to mutually convert a received over-the-air frame and an internet protocol (IP) packet, and serves as a router between a terminal device and a remaining part of an access network. The remaining part of the access network may include an IP network and the like. The network device may further coordinate attribute management of an air interface. For example, the network device may be an evolved NodeB (eNB or e-NodeB) in LTE, a new radio controller (NR controller), a gNodeB (gNB) in a 5G system, a centralized network unit (centralized unit), a new radio base station, a radio remote module, a micro base station, a relay, a distributed network unit (distributed unit), a transmission reception point (TRP), a transmission point (TP), or any other radio access device. However, the embodiments of this application are not limited thereto. The network device may cover one or more cells.

FIG. 1 shows a communications system provided in an embodiment of this application. The communications system includes a network device and six terminal devices, for example, UE 1 to UE 6. In the communications system, the UE 1 to the UE 6 each may send a signal to the network device by using an unlink, and the network device may receive the uplink signals sent by the UE 1 to the UE 6. In addition, the UE 4 to the UE 6 may also constitute a communications subsystem. The network device may send a downlink signal to the UE 1, the UE 2, the UE 3, and the UE 5 by using a downlink. The UE 5 may send a signal to the UE 4 and the UE 6 by using a sidelink (SL) based on a D2D technology. FIG. 1 is merely a schematic diagram. A type of the communications system is not limited in this application, and a quantity and types of devices included in the communications system are not specifically limited in this application either.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

A D2D communications technology is a communication mode in which two peer user nodes directly communicate with each other. D2D communication has different applications in different networks, for example, Wi-Fi direct in a Wi-Fi network or a Bluetooth technology (which is a type of short-range time division duplex communication). As a key technology in 4G technologies, D2D communication has gained great attention. The 3rd generation partnership project (3GPP) introduced LTE-D2D/V2X into LTE. The LTE-V2X (Vehicle to everything) technology even enables application of the D2D communications technology to an internet of vehicles for vehicle-to-vehicle communication. D2D intends to enable user communications devices within a specific distance range to directly communicate with each other, to reduce load on a serving base station. 3GPP has started to study 5G technologies since release R15, and an access network technology thereof is referred to as new radio (NR), which intends to provide a higher communication rate and allow a larger quantity of connected devices than 4G technologies. The 3GPP organization is also devoted to researching on an NR-V2X technology, which is an enhancement of the LTE-V2X technology. Based on different frequency bands in which D2D technologies operate, the D2D technologies can be categorized into D2D technologies that operate in a licensed frequency band, for example, LTE-D2D/V2X and NR-V2X, and D2D technologies that operate in an unlicensed frequency band, for example, Wi-Fi direct and the Bluetooth technology. In NR, release R16 also introduced a 5G NR in unlicensed spectrum (5G NR-U) technology, which mainly focuses on application of the NR technology in an unlicensed frequency band. 3GPP will also start to research on an NR-U-D2D technology in release R17, to enhance application of NR-V2X in R17.

In an unlicensed frequency band, a transmit node needs to access a channel through contention, that is, needs to perform LBT before accessing a channel. The transmit node can access a channel to transmit a signal only when the channel is idle. Communication in an unlicensed frequency band has specific uncertainty compared with that in a licensed frequency band. The uncertainty is caused by an idle state of a channel. Contention-based access can ensure fairness in accessing a channel by users using the frequency band.

Figure 2:
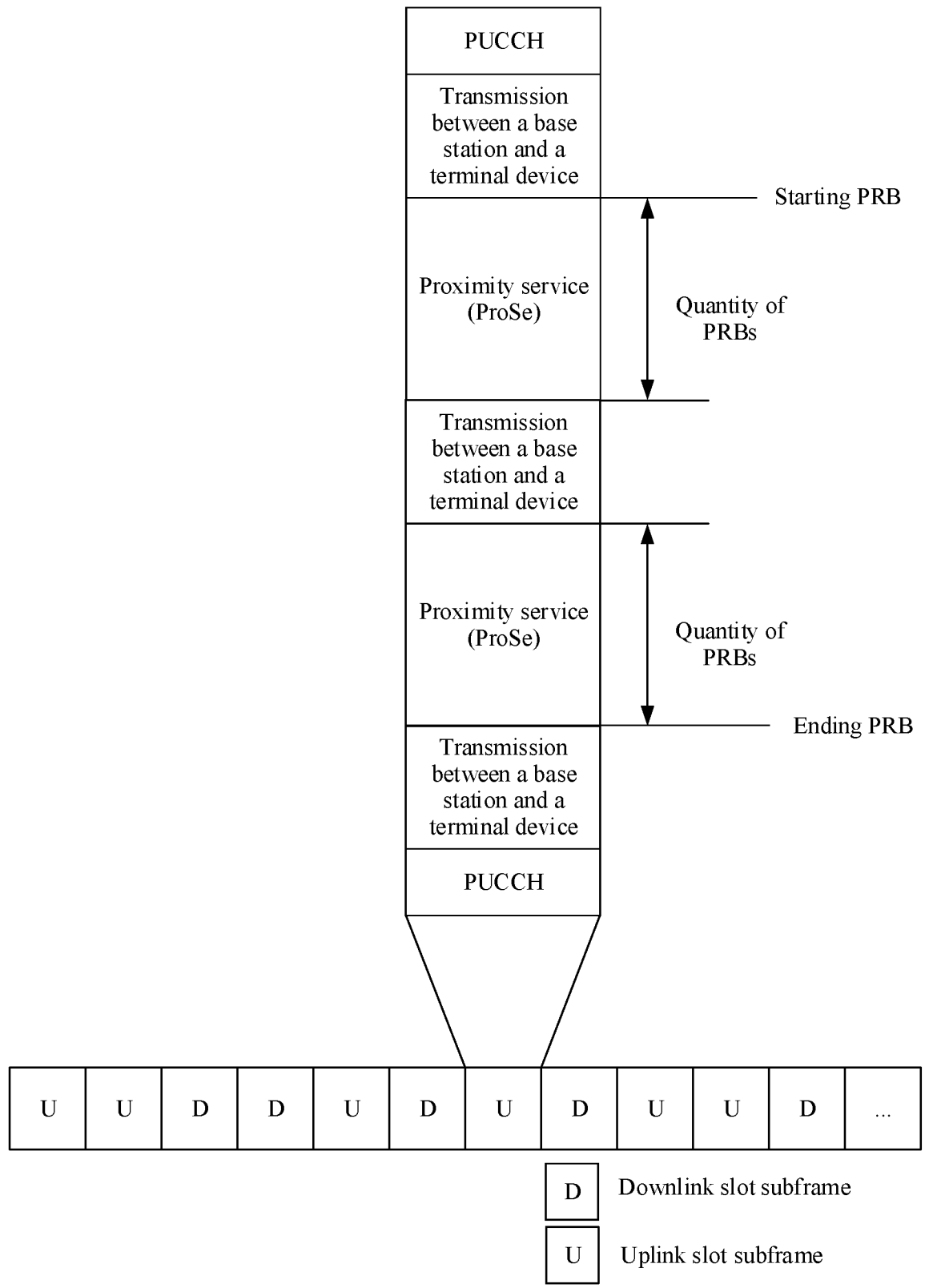
FIG. 2 is a schematic diagram of a D2D transmission resource according to this application.

LTE has started to support device-to-device communication, referred to as D2D or sidelink communication, in a cellular network since 3GPP Release 12. To avoid a conflict between D2D communication and existing universal user (UU) communication, a standard stipulates a resource pool for D2D communication. To be specific, a base station configures, by using RRC signaling, some common time-frequency resources for D2D transmission. As shown in FIG. 2, a slot for D2D transmission is distributed in an uplink slot subframe. In a subframe for D2D transmission, a frequency resource for sidelink transmission is divided into two subbands. In one subband, a starting physical resource block (PRB) (namely, PRB-Start) is used to indicate a frequency start point of the subband. In the other subband, an ending PRB (namely, PRB-End) is used to indicate a frequency end point of the other subband. A frequency width of each subband is represented by a quantity of PRBs (PRB-number). A frequency resource not used for sidelink communication may be used for transmission between a base station and a terminal.

UU communication supports two types of unlink grant-free transmission, which are respectively type 1 physical uplink shared channel (PUSCH) transmission with a configured grant (Type 1 PUSCH transmission with a configured grant, or Type 1 configured grant PUSCH transmission) and type 2 PUSCH transmission with a configured grant (Type 2 PUSCH transmission with a configured grant, or Type 2 configured grant PUSCH transmission).

In the type 1 PUSCH transmission with a configured grant, a higher-layer parameter ConfiguredGrantConfig is used to configure all transmission resources and transmission parameters for a terminal device, including a period of a time domain resource, a parameter related to open-loop power control, a waveform, a redundancy version sequence, a repeat count, a frequency hopping mode, a resource allocation type, a quantity of hybrid automatic repeat request (HARQ) processes, a parameter related to a demodulation reference signal (DMRS), a modulation and coding scheme (MCS) list, a size of a resource block group (RBG), a time domain resource, a frequency domain resource, an MCS, and the like. After receiving the higher-layer parameter, the terminal device may immediately perform PUSCH transmission on a configured time-frequency resource by using the configured transmission parameters.

In the type 2 PUSCH transmission with a configured grant, a resource configuration mode including two steps is used: First, a higher-layer parameter ConfiguredGrantConfig is used to configure transmission resources and transmission parameters for a terminal device, including a period of a time domain resource, a parameter related to open-loop power control, a waveform, a redundancy version sequence, a repeat count, a frequency hopping mode, a resource allocation type, a quantity of HARQ processes, a parameter related to a demodulation reference signal, an MCS list, a size of an RBG, and the like. Then, the type 2 PUSCH transmission with a configured grant is activated by using DCI, and other transmission resources and transmission parameters such as a time domain resource, a frequency domain resource, a DMRS, and an MCS are configured for the terminal device. When receiving the ConfiguredGrant-Config parameter, the terminal device cannot perform PUSCH transmission immediately by using the resources and parameters configured by the higher-layer parameter, and can perform PUSCH transmission only after corresponding DCI is received and the other resources and parameters are activated and configured.

Two D2D resource configuration modes are available in LTE: mode 1 and mode 2. In the resource configuration mode of mode 1, a base station configures a plurality of resource pools for a D2D device in advance by using RRC signaling. When the D2D device requests to perform D2D transmission, the base station activates, by using DCI signaling, a corresponding resource pool for D2D transmission. A difference of the resource configuration mode of mode 2 from the resource configuration mode of mode 1 lies in that when a D2D device needs to perform D2D transmission, the D2D device autonomously selects, from a predefined resource pool, some time-frequency resources for performing D2D transmission.

Figure 3:
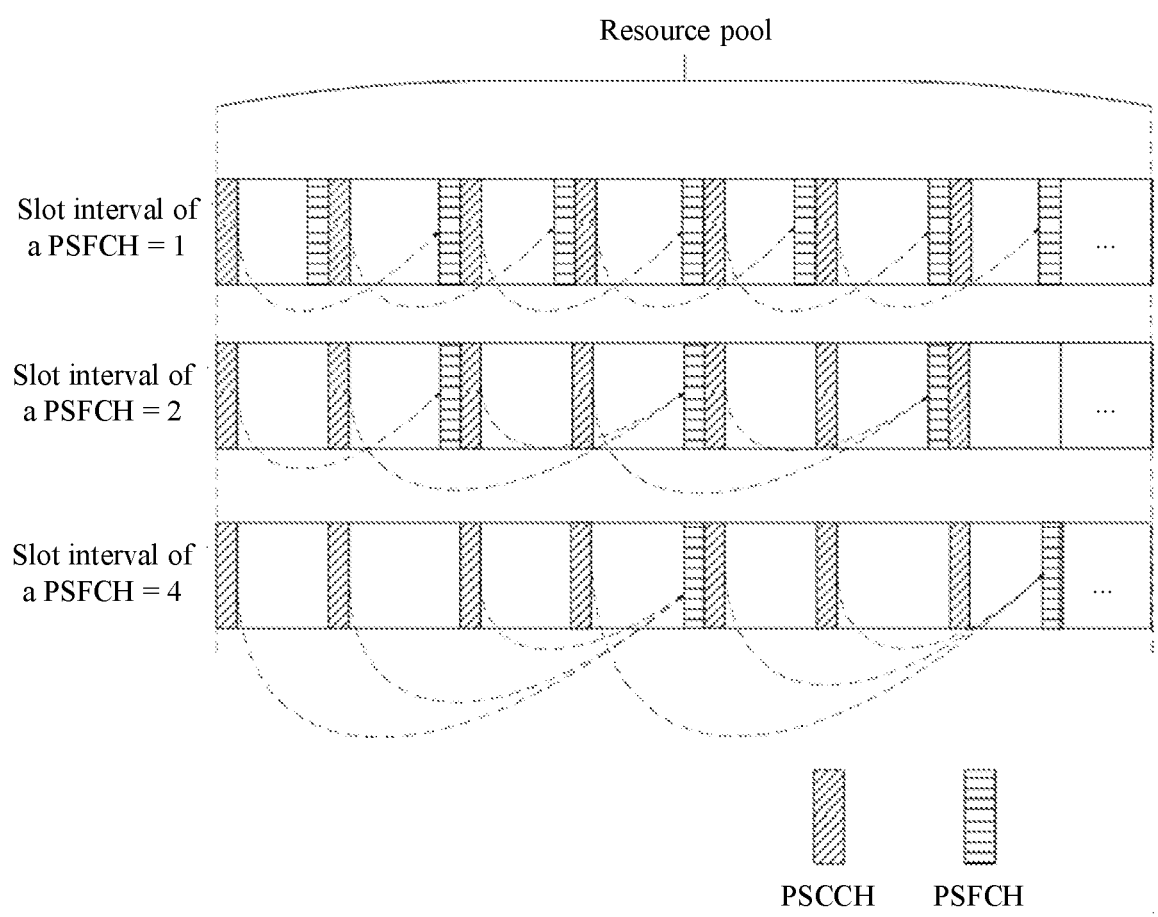
FIG. 3 is a schematic diagram of a D2D transmission resource configuration method according to this application.

In NR-V2X, a D2D resource transmission mode also uses a resource pool-based resource configuration mode similar to that in LTE-D2D. As shown in FIG. 3, in a resource pool, a physical sidelink feedback channel (PSFCH) resource for sending a feedback channel is periodically configured for a user by using upper-layer signaling (for example, RRC signaling). A correspondence between a downlink control channel (physical sidelink control channel, PSCCH) and the physical sidelink feedback channel (PSFCH) is indicated in a non-explicit indication manner. Embodiments of this application provide an indication signal transmission method and apparatus. The method and the apparatus are based on a same technical concept. Because problem-resolving principles of the method and the apparatus are similar, implementations of the apparatus and the method may be mutually referenced, and repeated parts are not described.

"A plurality of" in this application means two or more.

In addition, it should be understood that, in the descriptions of this application, terms such as "first" and "second" are merely used for distinction and description, but cannot be understood as an indication or implication of relative importance or an indication or implication of a sequence.

The following describes in detail an indication signal transmission method according to an embodiment of this application with reference to accompanying drawings.

Figure 4:
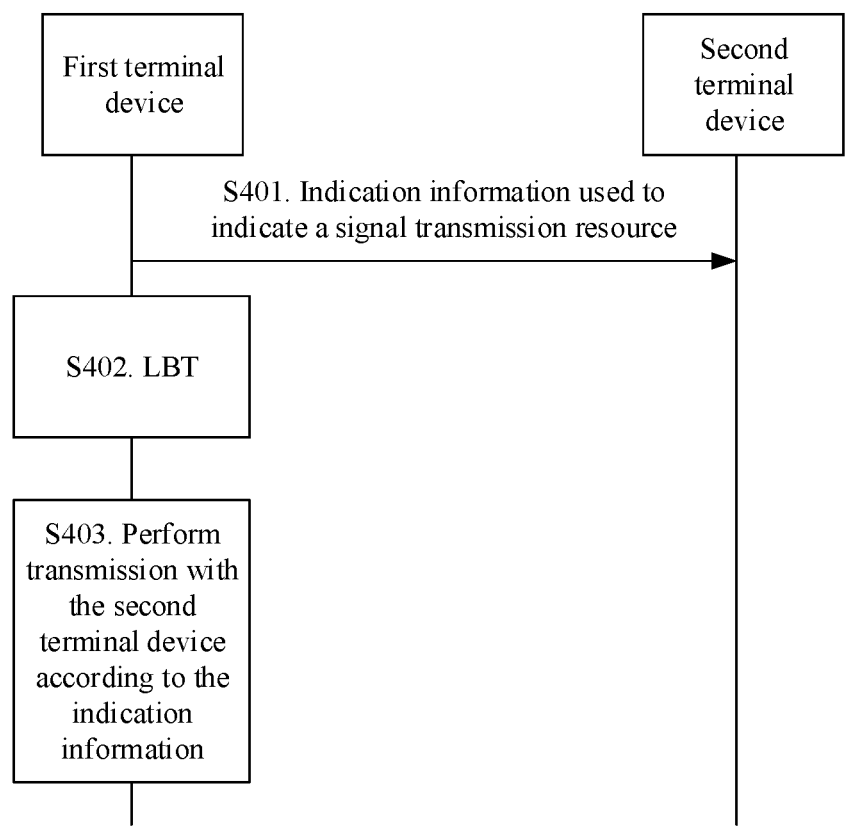
FIG. 4 is a schematic flowchart of an indication signal transmission method according to this application.

FIG. 4 is a flowchart of an indication signal transmission method according to this application. The method includes the following steps.

S401. A first terminal device sends, to a second terminal device, indication information used to indicate a signal transmission resource for the first terminal device. Correspondingly, the second terminal device receives the indication information.

For example, the indication information may be sidelink control information (SCI). The first terminal device may send the indication information in a broadcast-like manner.

The transmission resource is used to transmit a signal between the first terminal device and the second terminal device. It should be noted that in an unlicensed spectrum scenario, a length of signals sent consecutively by a node is limited. If a signal needs to be sent again after a sending operation is completed, LBT needs to be performed. Therefore, signals sent consecutively may be referred to as a burst, or may be referred to as a frame signal. For example, signals sent consecutively by the first terminal device to the second terminal device may be understood as a frame signal sent by the first terminal device (or a burst sent by the first terminal device), and signals sent consecutively by the second terminal device to the first terminal device may be understood as a frame signal sent by the second terminal device (or a burst sent by the second terminal device).

It should be understood that "signal" is merely an example name, and does not limit a name of signals sent consecutively. During specific implementation, signals sent consecutively may alternatively be named otherwise, for example, a frame signal or a burst, which is not specifically limited herein.

The frame signal may be transmitted on the transmission resource between the first terminal device and the second terminal device.

The transmission resource between the first terminal device and the second terminal device may be configured for the first terminal device by a network device by using a first message. Specifically, before the first terminal device sends the indication information to the second terminal device, the network device may send the first message to the first terminal device. The first message is used to configure (which may also be referred to as "indicate) the transmission resource between the first terminal device and the second terminal device. In this way, after receiving the first message, the first terminal device may perform channel contention (which may also be referred to as channel preemption or LBT) on the transmission resource configured by using the first message, that is, perform step S402.

In an embodiment, when configuring, for the first terminal device, the transmission resource between the first terminal device and the second terminal device by using the first message, the network device may reuse an existing type 1 configured grant resource indication. For example, the first message is upper-layer signaling, for example, RRC signaling. The network device sends, by using the RRC signaling, a period of a configured grant resource, a slot offset of the configured grant resource relative to the upper-layer signaling, a transmit power control parameter (power control, PC), a repeat count K, and other related control parameters such as DMRS configuration. The repeat count K is a quantity of slots or symbols.

Figure 5:
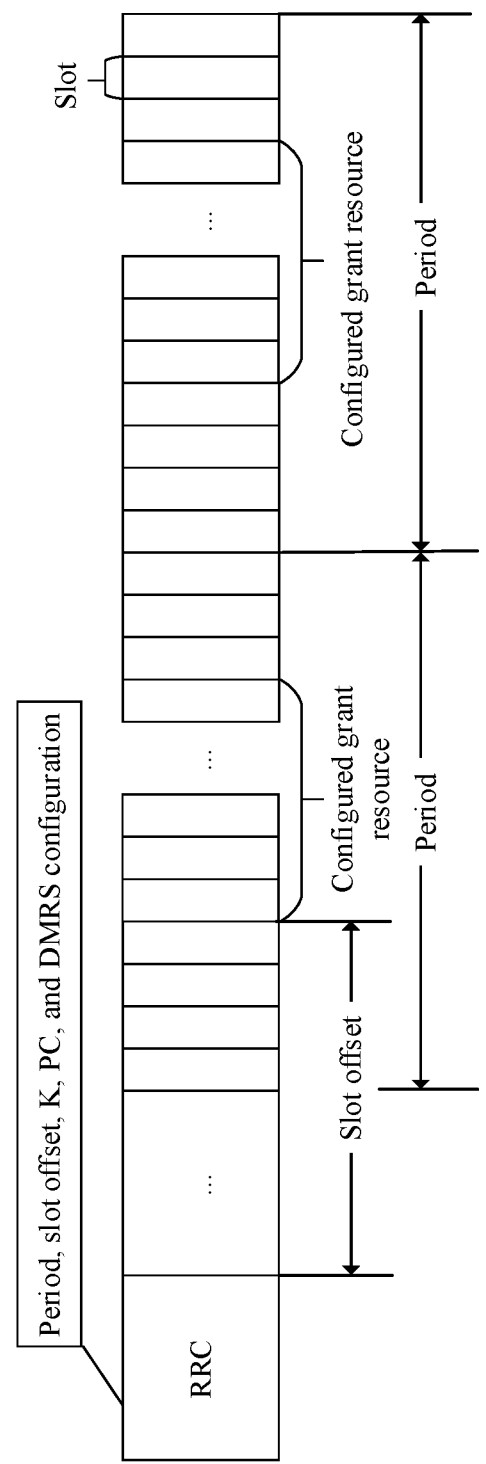
FIG. 5 is a schematic diagram of a transmission resource configuration mode according to this application.

After receiving the RRC signaling, the first terminal device may listen to a channel on a nearest configured grant resource, that is, perform step S402. Details are shown in FIG. 5.

Figure 6:
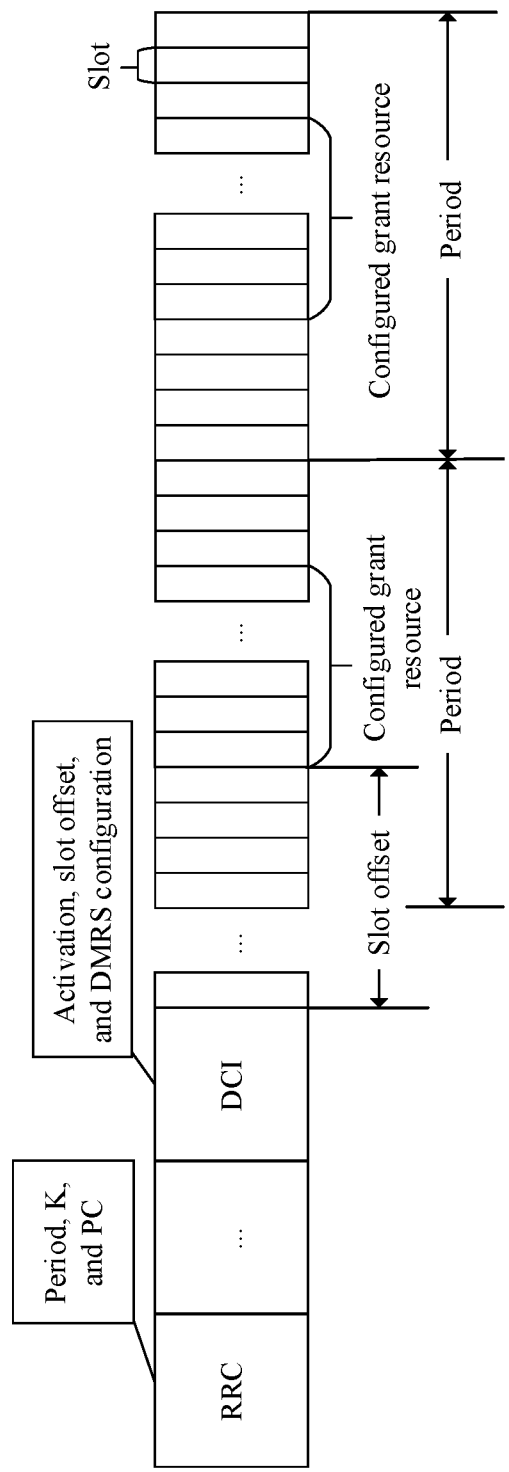
FIG. 6 is a schematic diagram of another transmission resource configuration mode according to this application.

In another embodiment, the network device may alternatively reuse an existing type 2 configured grant resource indication. For example, the first message is upper-layer signaling, for example, RRC signaling. The network device sends a period of a configured grant resource, a transmit power control parameter PC, and a repeat count K by using the RRC signaling, and then activates a preconfigured configured grant resource by using downlink control information (DCI). The DCI may carry other control parameters for configuring the configured grant resource, for example, a slot or symbol offset of the corresponding configured grant resource relative to the DCI, DMRS configuration, and other information. Details are shown in FIG. 6.

After receiving configured grant configuration information configured by using the network-side RRC signaling and receiving the DCI signaling, a terminal device determines a period of a sidelink time domain resource based on period information in the RRC signaling; determines, based on the transmit power control parameter PC, a maximum transmit power for sidelink communication; and determines a quantity of slots or symbols available in time domain in the sidelink time domain period based on the repeat count K. If the type 1 configuration mode is used, the slot or symbol offset is a delay from when the RRC signaling is received to a first period of the sidelink time domain resource. If the type 2 configuration mode is used, the slot or symbol offset is a delay from when the DCI signaling is received to a first period of the sidelink time domain resource.

In the foregoing method, a configured grant-based resource configuration mode is used, which is more flexible. This can avoid a problem of a waste of D2D transmission resources caused when no channel is obtained through contention in an uplink slot. This problem is common in a resource pool-based resource configuration mode that is used in NR-V2X and in which D2D transmission is performed always in an uplink slot.

In another embodiment, in addition to the configured grant-based semi-static sidelink resource configuration mode, the network device may alternatively dynamically configure, by using the first message, a segment of time-frequency resources that are continuous in time domain, for the first terminal device to perform sidelink communication with the second terminal device. For example, the first message may be DCI signaling. The DCI signaling may carry at least one of the following information: a slot or symbol offset of the time-frequency resource relative to the DCI signaling, DMRS configuration information, a transmit power parameter PC, time domain resource duration K, a starting PRB in frequency domain, a quantity of PRBs, and the like. In other words, the network device may send the slot or symbol offset of the time-frequency resource relative to the DCI signaling, the DMRS configuration information, the transmit power parameter PC, the time domain resource duration K, the starting PRB in frequency domain, and the quantity of PRBs to the first terminal device by using the DCI signaling.

The first message may be further used to indicate, to the first terminal device, a time-frequency resource for sending and receiving indication information. Specifically, the first message may carry an intra-slot symbol offset, a starting PRB, and a quantity of PRBs of the time-frequency resource for sending and receiving indication information.

In this way, the first terminal device may send the indication information on the time-frequency resource or receive, on the time-frequency resource, indication information sent by another terminal device. A frequency width occupied by the indication information may be less than or equal to a width of a bandwidth part (BWP) of the transmission resource between the first terminal device and the second terminal device.

S402. The first terminal device performs LBT before performing transmission with the second terminal device.

Specifically, before communicating with the second terminal device, the first terminal device may perform channel contention first. After preempting a channel, the first terminal device may perform step S403. To be specific, the first terminal device sends a frame signal, and the second terminal device receives the frame signal according to the indication information.

S403. The second terminal device communicates with the first terminal device according to the indication information of the frame signal.

Specifically, the first terminal device sends, to the second terminal device, control information that is carried in a control channel and data (DATA) that is carried in a shared channel; and may further indicate a location of a time-frequency resource for the second terminal device to send feedback information. The feedback information may be sent by using a feedback channel. The feedback channel is used to feed back a result of receiving the data by the second terminal device. For example, the control channel may be a physical sidelink control channel (PSCCH), the shared channel may be a physical sidelink shared channel (PSSCH), and the feedback channel may be a PSFCH.

In this case, that the first terminal device communicates with the second terminal device may be that the two terminal devices directly communicate with each other without requiring forwarding by the network device. For example, a mode of communication between the first terminal device and the second terminal device may be referred to as D2D transmission, may be referred to as sidelink communication, or may be referred to as another name. This is not specifically limited herein.

In this embodiment of this application, the first terminal device sends the indication information of the frame signal to the second terminal device. This is convenient for the first terminal device to perform transmission with the second terminal device at a configured resource location, and a flexible frame structure can be supported in an unlicensed frequency band. Using the foregoing embodiment resolves a technical problem that an existing D2D transmission resource configuration mode cannot be well applied to an unlicensed frequency band due to uncertainty of accessing a channel by using the unlicensed frequency band, and also resolves a technical problem that an existing PSFCH configuration mode cannot be applied to an unlicensed frequency band because channel contention needs to be performed before a channel is accessed for transmitting a PSFCH.

Figure 7:
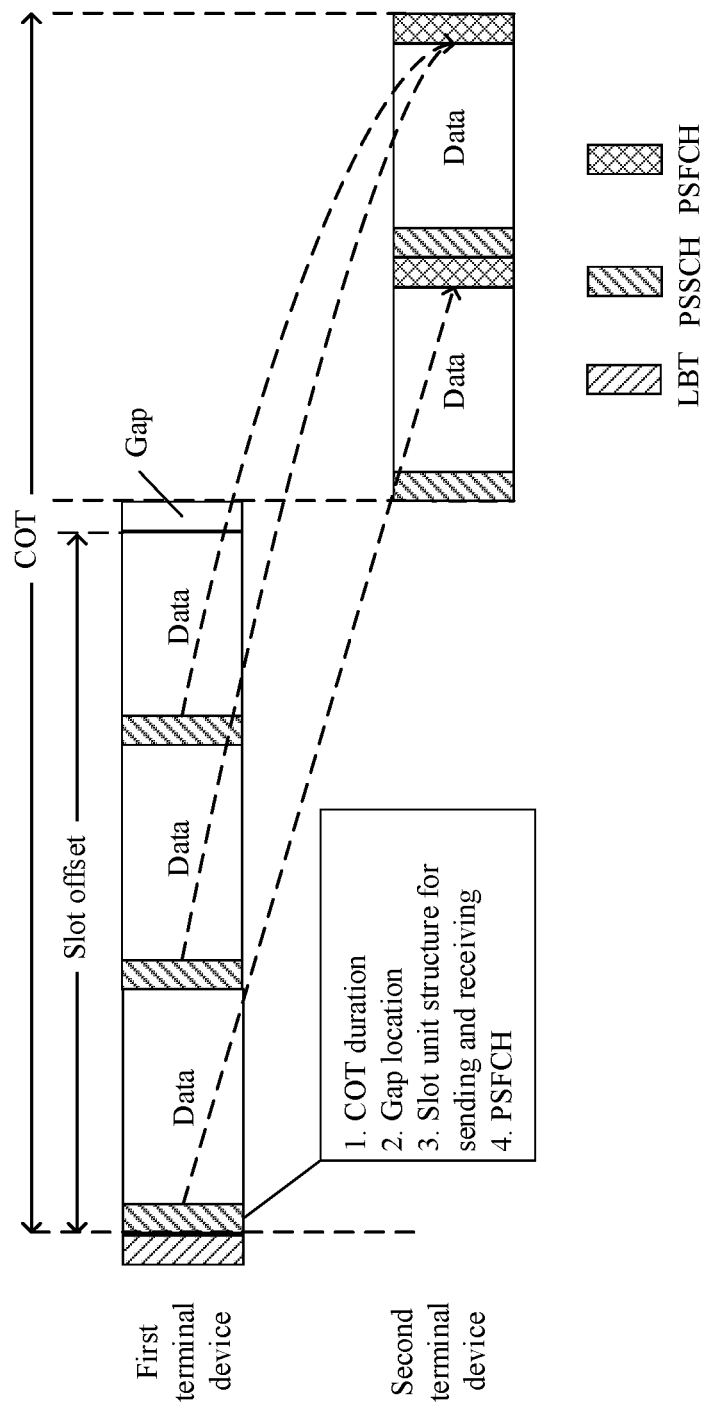
FIG. 7 is a schematic diagram of a frame signal according to this application.

In an embodiment, the indication information may carry one or more of the following information: channel occupancy duration, frame structure information, and feedback channel resource indication information. The feedback channel resource indication information is used to indicate a feedback channel resource, and the second terminal device may send the feedback channel on the feedback channel resource. The feedback channel is used to carry a result of receiving by the second terminal device. In addition, the indication information may further carry one or more of the following information: a physical layer 1 (PHY Layer 1, L1) address of the first terminal device (that is, an L1 source address (L1 source ID, L1 SRC ID) of the transmission), an L1 address of the second terminal device (that is, an L1 receiving address or an L1 destination address (L1 destination ID, L1 DST ID) of the transmission), a hybrid automatic repeat request (HARQ) process ID, a new data indicator (NDI), a redundancy version (RV), and other information. Details are shown in FIG. 7.

The channel occupancy duration may also be referred to as a channel occupancy time (COT). The COT includes duration from when the first terminal device and the second terminal device start transmission to when the first terminal device and the second terminal device end transmission. The first terminal device and the second terminal device may perform one or more transmission operations in one COT. Another terminal device that receives the COT duration cannot access a channel in the COT if the another terminal device learns that the L1 destination address in the indication information is not an address of the another terminal device or a group address. This ensures that the first terminal device is not interfered with by other terminal devices in a channel occupancy period. The channel occupancy duration may use a slot as a granularity or may use a symbol as a granularity, or the channel occupancy duration may be an absolute time value.

The frame structure information may indicate a transmission direction of each slot unit in the transmission resource between the first terminal device and the second terminal device (in other words, the frame structure information may indicate a slot unit structure that is in the transmission resource and that is used for sending and receiving), and location information of an idle (gap) slot. The idle slot may be used to indicate a pause in the channel occupancy duration, or used to indicate switching of a transmission direction.

For example, a format of SCI signaling may be shown in Table 1.

TABLE 1

| L1 SRC ID | L1 DST ID | HARQ process ID (HARQ process ID) | NDI Negative direction indicator | RV Version | COT duration (COT duration) | COT structure (Frame structure information) | Idle slot location (Gap location indicator) | PSFCH resource location (Feedback channel resource location) |
| --- | --- | --- | --- | --- | --- | --- | --- | --- |

In some embodiments, the slot unit structure that is in the transmission resource and that is used for sending and receiving may use a bitmap. For example, a value of a bit being 1 represents that a corresponding slot is a sending slot, and a value of a bit being 0 represents that a corresponding slot is a receiving slot. Alternatively, a value of a bit being 0 represents that a corresponding slot is a receiving slot, and a value of a bit being 1 represents that a corresponding slot is a sending slot. A sending device performs sending in a sending slot, and a receiving device performs receiving in a receiving slot. In some embodiments, a sending slot may alternatively be shared with a receiving device for performing sending. Time represented by 1 bit of information may use a slot as a unit, or may use a symbol as a unit. Considering that a greatest length of a frame signal (burst) is limited in an unlicensed frequency band, a greatest bit length of the bitmap may be predefined. A length of valid bits in a frame signal is deduced based on the channel occupancy duration and the location information of the idle slot, thereby obtaining a valid frame signal.

It should be understood that the sending device and the receiving device are relative terms. The sending device may also have a receiving function, and the receiving device may also have a sending function.

Figure 8:
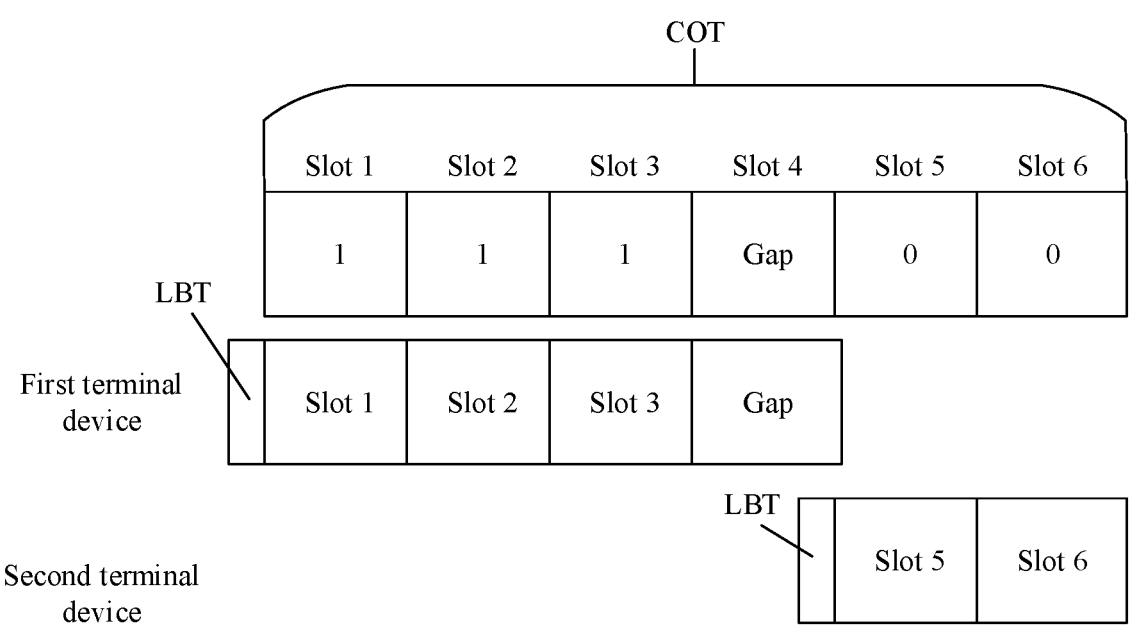
FIG. 8 is a schematic diagram of a frame structure according to this application.

For example, a value of a bit being 1 represents a sending slot, and a value of a bit being 0 represents a receiving slot. It is assumed that the transmission resource includes six slots. Slots 1 to 3 are sending slots, a slot 4 is an idle slot, and slots 5 and 6 are receiving slots. The first terminal device indicates to the second terminal device in the indication information that the bitmap is 11100 and that the idle slot is the slot 4. Then, the second terminal device can determine that "111" corresponds to the slots 1 to 3 (to be specific, the slots 1 to 3 are slots used for sending by the first terminal device), the slot 4 is an idle slot, and "00" corresponds to the slots 5 and 6 (to be specific, the slots 5 and 6 are slots used for receiving by the second terminal device). As shown in FIG. 8, signals sent consecutively by the first terminal device in the slots 1 to 3 may be considered as a frame signal (or a burst), and signals sent consecutively by the second terminal device in the slots 5 and 6 may be considered as a frame signal (or a burst).

For example, the location information of the idle slot may include a slot offset of the idle slot relative to a slot in which the indication information is located, an intra-slot symbol offset, and a symbol length.

The feedback channel resource indication information may include a slot offset of the feedback channel resource relative to the slot in which the indication information is located, an intra-slot symbol offset, a symbol length, and an occupied bandwidth.

In the foregoing manner, the COT is indicated in the indication information. This is favorable for channel occupancy protection and COT sharing in transmission between the first terminal device and the second terminal device. A channel resource location of the feedback channel is flexibly indicated. Compared with a fixed feedback channel indication manner in NR-V2X, the foregoing manner can support a flexible frame structure in an unlicensed frequency band.

Figure 9:
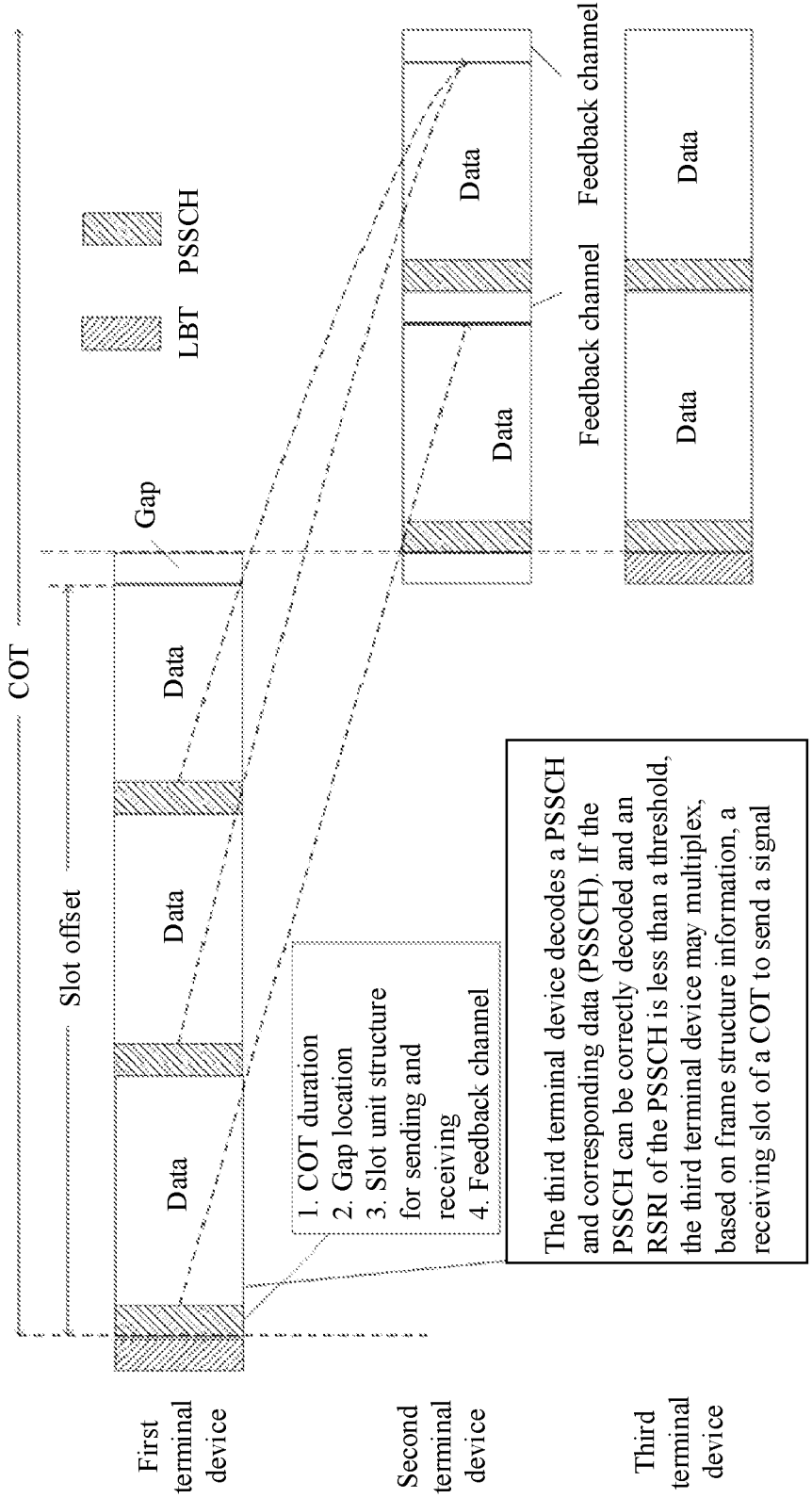
FIG. 9 is a schematic diagram of a frame signal according to this application.

In addition, the frame structure information may be further used to indicate a third terminal device to multiplex the transmission resource between the first terminal device and the second terminal device. As shown in FIG. 9, if the third terminal device can obtain, through demodulation, a PSCCH sent by the first terminal device, and if CRC succeeds, the third terminal device measures a received signal strength indicator (RSSI) of a PSSCH indicated by the PSCCH or an RSSI of a corresponding reference signal. If the measured RSSI is less than a threshold, the third terminal device may multiplex a resource in a receiving part of a current COT according to the indication information of the frame signal. In other words, the third terminal device may perform transmission in a receiving slot indicated by the indication information. In the foregoing manner, when the RSSI measured by the third terminal device is relatively small, the third terminal device may multiplex the transmission resource between the first terminal device and the second terminal device as indicated by the indication information, thereby improving spectrum utilization efficiency without affecting transmission between the first terminal device and the second terminal device.

In an embodiment, the first message may further carry a transmission direction of the transmission resource.

Figure 10:
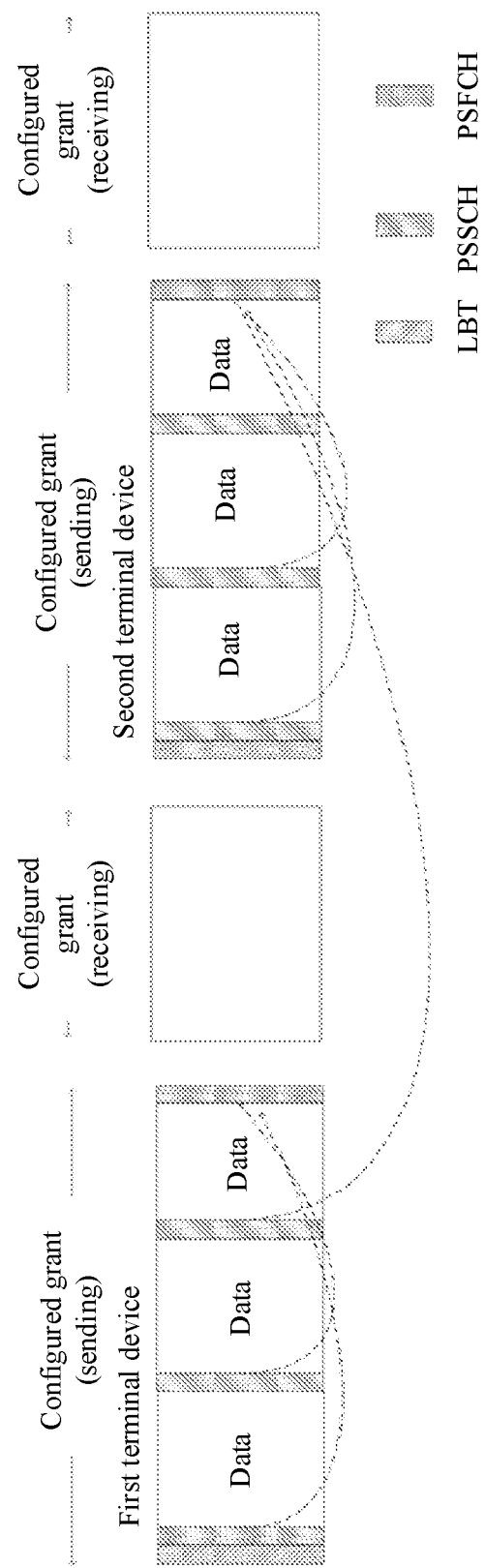
FIG. 10 is a schematic diagram of a resource configuration according to this application.

As shown in FIG. 10, when configuring, by using the first message (for example, RRC signaling), a configured grant resource for D2D transmission, the network device may indicate, in the RRC signaling, a transmission direction of the configured grant resource. To be specific, the RRC signaling includes TX/RX type indication information indicating the transmission direction of the configured grant resource by using 1 bit. For example, a value of a bit being 1 represents that a corresponding configured grant resource is only used for sending D2D data or signaling and/or used for receiving a PSFCH, and a value of a bit being 0 represents that a corresponding configured grant resource is only used for receiving D2D data or receiving signaling and/or sending a PSFCH.

D2D sending resource locations whose resources are orthogonal to each other are allocated to different terminal devices. This can alleviate a problem of interference at a receive end caused by a hidden node, thereby improving a success rate of D2D sending, reducing a bit error rate at the receive end, and improving spectral efficiency. Using a frame signal shown in FIG. 8 as an example, the second terminal device performs LBT before a slot 5, and prepares to send a signal in the slot 5. If another terminal device also contends for the channel at this time, an LBT result of the second terminal device is affected. In this case, if the second terminal device failed to preempt the channel, the second terminal device cannot send the signal to the first terminal device. However, in this embodiment of this application, when a configured grant resource is configured, by using RRC signaling, for D2D transmission, a transmission direction of the configured grant resource may be indicated in the RRC signaling. In this way, even if another terminal device does not know that the first terminal device and the second terminal device are occupying the channel, the another terminal device can still learn, from a configured grant resource configuration indication sent by the network device, that the channel can only be used for receiving but cannot be used for sending, and therefore, does not perform LBT on this part of resources. Therefore, this can reduce interference caused by preempting the transmission resource between the first terminal device and the second terminal device by other terminal devices, thereby further improving a success rate of transmission between the first terminal device and the second terminal device, reducing a bit error rate at a receive end, and improving spectral efficiency.

For example, when configuring, by using RRC signaling, a configured grant resource for D2D transmission, the network device may configure a direction of the configured grant resource to "sending" for the first terminal device and configure a direction of the configured grant resource to "receiving" for a fourth terminal device. When the first terminal device sends the frame signal shown in FIG. 8 to the second terminal device, if the second terminal device contends for a channel before the slot 5, the fourth terminal device does not contend for the channel because the direction of the configured grant resource configured for the fourth terminal device is "receiving". In this way, the fourth terminal device does not interfere with the second terminal device in sending a signal to the first terminal device.

Figure 11:
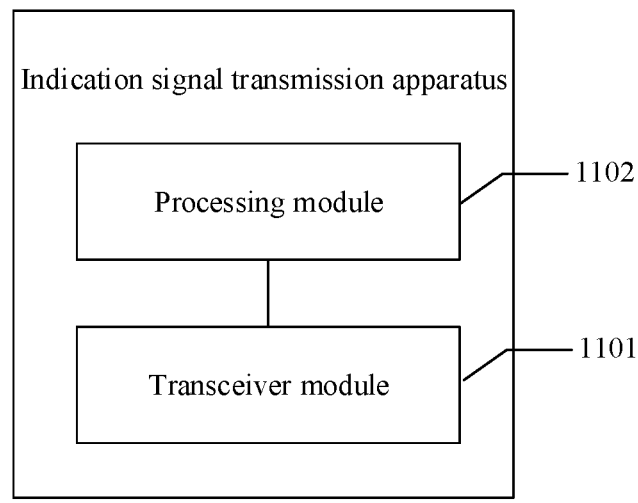
FIG. 11 is a schematic diagram of an architecture of an indication signal transmission apparatus according to this application.

Based on the same inventive concept as the method embodiment, an embodiment of this application provides an indication signal transmission apparatus. The indication signal transmission apparatus may be specifically configured to implement the method performed by the first terminal device in the embodiments in FIG. 4 to FIG. 10. The apparatus may be the first terminal device, or may be a chip or chipset in the first terminal device or a part that is of a chip and that is configured to perform related method functions. A structure of the indication signal transmission apparatus may be shown in FIG. 11, and includes a transceiver module 1101 and a processing module 1102. The transceiver module 1101 is configured to send, to a second terminal device, indication information used to indicate a signal transmission resource. The processing module 1102 is configured to perform LBT by using the transceiver module before the transceiver module 1101 performs transmission with the second terminal device. The transceiver module 1101 is further configured to perform transmission with the second terminal device according to the indication information.

For example, the indication information may be SCI.

In an example for description, the indication information may carry at least one of the following information: channel occupancy duration, frame structure information, and feedback channel resource indication information, where the feedback channel resource indication information is used to indicate a feedback channel resource.

The frame structure information may include a transmission direction of each slot unit in the transmission resource between the first terminal device and the second terminal device, and location information of an idle slot.

Further, the location information of the idle slot may include a slot offset of the idle slot relative to the indication information, an intra-slot symbol offset, and a symbol length.

In addition, the frame structure information may be further used to indicate a third terminal device to multiplex the transmission resource between the first terminal device and the second terminal device.

The feedback channel resource indication information may include a slot offset of the feedback channel resource relative to the indication information, an intra-slot symbol offset, a symbol length, and an occupied bandwidth.

In an implementation, before sending the indication information to the second terminal device, the transceiver module 1101 may be further configured to receive a first message sent by a network device, where the first message is used to configure the transmission resource between the first terminal device and the second terminal device. In an implementation, the first message may be DCI. For example, the transmission resource may be a segment of time-frequency resources that are continuous in time domain.

The first message may carry a transmission direction of the transmission resource.

In addition, the first message may be further used to indicate, to the first terminal device, a time-frequency resource for sending and receiving indication information.

Specifically, the first message may carry an intra-slot symbol offset, a starting PRB, and a quantity of PRBs of the time-frequency resource for sending and receiving indication information.

Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in the embodiments of this application, further refer to related descriptions in the method embodiments.

Figure 12:
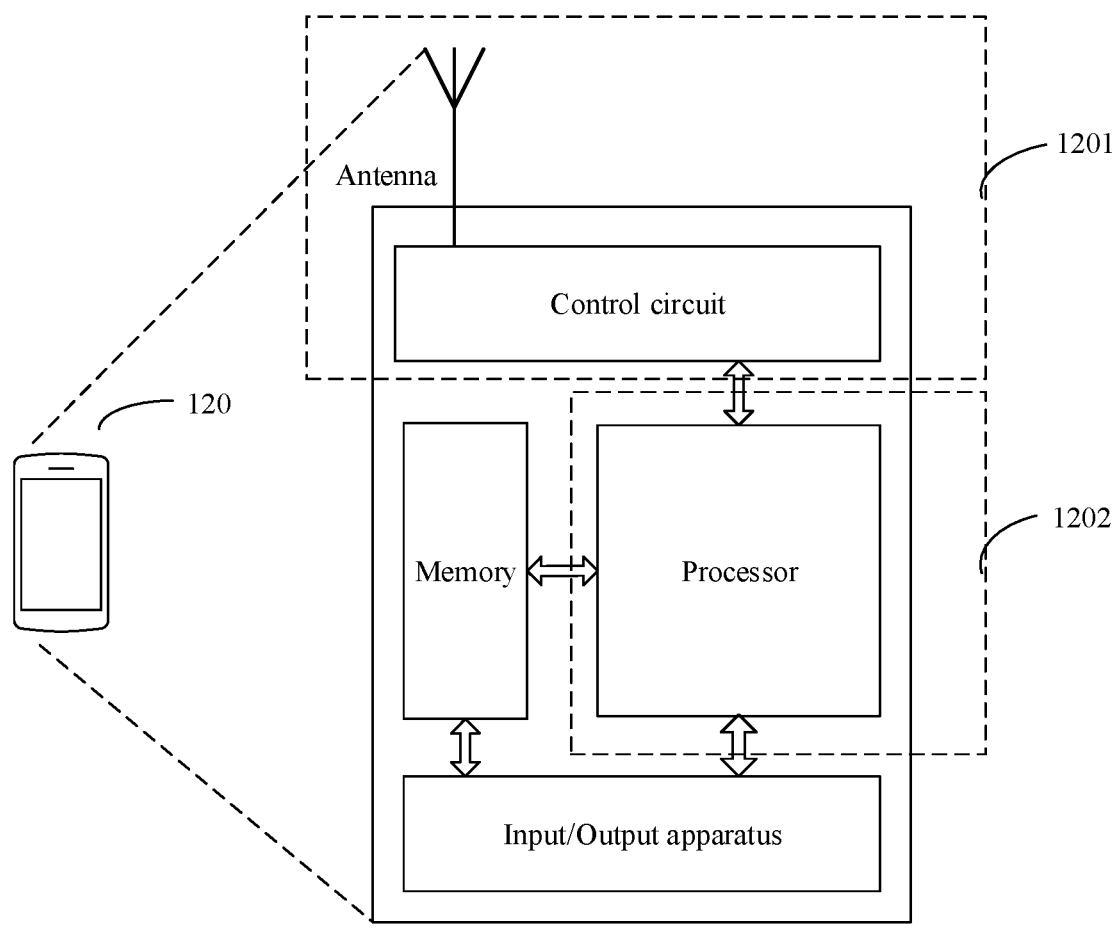
FIG. 12 is a schematic diagram of a structure of a terminal device according to this application.

FIG. 12 is a schematic diagram of a structure of a terminal device according to an embodiment of this application. The terminal device may be applied to the system shown in FIG. 1 and perform functions of the first terminal device in the foregoing method embodiment. For ease of description, FIG. 12 shows only main components of the terminal device. As shown in FIG. 12, the terminal device 120 includes a processor, a memory, a control circuit, an antenna, and an input/output apparatus.

The processor is mainly configured to process a communication protocol and communication data, control the entire terminal device, execute a software program, and process data of the software program. For example, the processor is configured to support the terminal device in performing actions described in the method embodiment, for example, support the first terminal device in sending, to a second terminal device, indication information used to indicate a signal transmission resource, performing LBT before performing transmission with the second terminal device, performing transmission with the second terminal device according to the indication information, and the like. The memory is mainly configured to store the software program and the data. The control circuit is mainly configured to: perform conversion between a baseband signal and a radio frequency signal, and process the radio frequency signal. The control circuit and the antenna together may also be referred to as a transceiver, which is mainly configured to transmit and receive radio frequency signals in a form of an electromagnetic wave. For example, the transceiver is configured to send, to the second terminal device under control of the processor, indication information used to indicate a frame signal sent by the first terminal device, perform LBT before performing transmission with the second terminal device, perform transmission with the second terminal device according to the indication information of the frame signal, and the like. The input/output apparatus, for example, a touchscreen, a display screen, or a keyboard, is mainly configured to receive data input by a user and output data to the user.

After the terminal device is powered on, the processor may read the software program in the memory, explain and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 12 shows only one memory and only one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor in FIG. 12. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In this embodiment of this application, the antenna and the control circuit that have receiving and sending functions may be considered as a transceiver unit 1201 of the terminal device 120, for example, to support the terminal device in performing a receiving function and a sending function. The processor that has a processing function is considered as a processing unit 1202 of the terminal device 120. As shown in FIG. 12, the terminal device 120 includes the transceiver unit 1201 and the processing unit 1202. The transceiver unit may also be referred to as a transceiver machine, a transceiver, a transceiver apparatus, or the like. Optionally, a component configured to implement the receiving function in the transceiver unit 1201 may be considered as a receiving unit, and a component configured to implement the sending function in the transceiver unit 1201 may be considered as a sending unit. In other words, the transceiver unit 1201 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processing unit 1202 may be configured to execute instructions stored in the memory to control the transceiver unit 1201 to receive a signal and/or send a signal, to complete functions of the terminal device in the foregoing method embodiment. The processor 1202 may specifically implement the functions of the processing module 1102 shown in FIG. 11. For specific functions, refer to related descriptions of the processing module 1102. Details are not described herein again. The processor 1202 further includes an interface, configured to implement a signal input/output function. In an implementation, it may be considered that a function of the transceiver unit 1201 is implemented by using a transceiver circuit or a transceiver-dedicated chip. The transceiver unit 1201 may implement the functions of the transceiver module 1101 shown in FIG. 11. For specific functions, refer to related descriptions of the transceiver module 1101. Details are not described herein again.

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Clearly, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. A method, comprising:
    sending, by a first terminal device to a second terminal device, indication information indicating a signal transmission resource, wherein the indication information carries feedback channel resource indication information, the feedback channel resource indication information indicates a feedback channel resource, and the feedback channel resource indication information comprises a slot offset of the feedback channel resource relative to the indication information, an intra-slot symbol offset, a symbol length, and an occupied bandwidth;
    performing, by the first terminal device, listen before talk (LBT) before performing transmission with the second terminal device; and
    performing, by the first terminal device, transmission with the second terminal device according to the indication information.

2. The method according to claim 1, wherein the indication information carries at least one of the following information: channel occupancy duration or frame structure information.

3. The method according to claim 2, wherein the frame structure information comprises a transmission direction of each slot unit in the signal transmission resource between the first terminal device and the second terminal device, and location information of an idle slot.

4. The method according to claim 3, wherein the location information of the idle slot comprises a slot offset of the idle slot relative to the indication information, an intra-slot symbol offset, and a symbol length.

5. The method according to claim 2, wherein the frame structure information comprises information for a third terminal device to multiplex the signal transmission resource between the first terminal device and the second terminal device.

6. An apparatus, comprising:
    one or more processors; and
    one or more memories storing one or more instructions executable by the one or more processors to perform operations comprising:
    sending, to a second terminal device, indication information indicating a signal transmission resource, wherein the indication information carries feedback channel resource indication information, the feedback channel resource indication information indicates a feedback channel resource, and the feedback channel resource indication information comprises a slot offset of the feedback channel resource relative to the indication information, an intra-slot symbol offset, a symbol length, and an occupied bandwidth;
    performing listen before talk (LBT) before performing transmission with the second terminal device; and
    performing transmission with the second terminal device according to the indication information.

7. The apparatus according to claim 6, wherein the indication information carries at least one of the following information: channel occupancy duration or frame structure information.

8. The apparatus according to claim 7, wherein the frame structure information comprises a transmission direction of each slot unit in the signal transmission resource between the apparatus and the second terminal device, and location information of an idle slot.

9. The apparatus according to claim 8, wherein the location information of the idle slot comprises a slot offset of the idle slot relative to the indication information, an intra-slot symbol offset, and a symbol length.

10. The apparatus according to claim 7, wherein the frame structure information comprises information for a third terminal device to multiplex the signal transmission resource between the apparatus and the second terminal device.

11. A non-transitory, computer-readable medium storing one or more instructions executable by at least one processor to perform operations comprising:
    sending, by a first terminal device to a second terminal device, indication information indicating a signal transmission resource, wherein the indication information carries feedback channel resource indication information, the feedback channel resource indication information indicates a feedback channel resource, and the feedback channel resource indication information comprises a slot offset of the feedback channel resource relative to the indication information, an intra-slot symbol offset, a symbol length, and an occupied bandwidth; and
    performing, by the first terminal device, listen before talk (LBT) before performing transmission with the second terminal device; and
    performing, by the first terminal device, transmission with the second terminal device according to the indication information.

12. The non-transitory, computer-readable medium according to claim 11, wherein the indication information carries at least one of the following information: channel occupancy duration or frame structure information.

13. The non-transitory, computer-readable medium according to claim 12, wherein the frame structure information comprises a transmission direction of each slot unit in the signal transmission resource between the first terminal device and the second terminal device, and location information of an idle slot.

14. The non-transitory, computer-readable medium according to claim 13, wherein the location information of the idle slot comprises a slot offset of the idle slot relative to the indication information, an intra-slot symbol offset, and a symbol length.

15. The non-transitory, computer-readable medium according to claim 12, wherein the frame structure information comprises information for a third terminal device to multiplex the signal transmission resource between the first terminal device and the second terminal device.

16. The non-transitory, computer-readable medium according to claim 11, wherein before sending the indication information to the second terminal device, the operations further comprise:
 receiving a first message sent by a network device, wherein the first message indicates the signal transmission resource between the first terminal device and the second terminal device.

17. The non-transitory, computer-readable medium according to claim 16, wherein the first message carries a transmission direction of the signal transmission resource.

* * * * *